Oct. 5, 1965                J. J. COLEMAN ETAL                3,210,023
                    DENDRITE PULLING AND REELING MECHANISM
Filed Jan. 28, 1963                                        2 Sheets-Sheet 1

WITNESSES:
Bernard R. Gregory
Carl R. Lippert

INVENTORS
Jacob J. Coleman, Walter J. Smith,
Richard C. Stewart & Jozsef M. Fekete.
BY
Frederick Shoprose
ATTORNEY United States Patent Office 3,210,023
Patented Oct. 5, 1965

3,210,023
DENDRITE PULLING AND REELING
MECHANISM
Jacob J. Coleman, Braddock, Walter J. Smith, Monroeville, and Richard C. Stewart and Jozsef M. Fekete, Pittsburgh, Pa., assignors to Westinghouse Electric Corporation, Pittsburgh, Pa., a corporation of Pennsylvania
Filed Jan. 28, 1963, Ser. No. 254,366
2 Claims. (Cl. 242—54)

This invention relates to a novel driving and pulling mechanism useful for growing or pulling dendritic crystalline material at a smooth and uniform rate.

At present, the various means employed for pulling and reeling dendritic crystalline material grown from a melt onto a reel have not proven entirely reliable.

Generally, the rate of withdrawing the seed and grown dendrite from the melt must be uniform and entirely free of uncontrolled irregular or jerking motions, otherwise a nonuniform product results. Also, the point from which the dendritic growth is pulled should be relatively unwavering and, further, must be taken from a specific area of the melt, normally at the center, and any serious deviations causing crystalline material which is inferior in quality and often commercially useless without further processing. The various means currently employed for pulling and collecting dendritic crystalline material on a reel often fail to satisfy these requisites in that irregular pull rates and melt-reel misalignment seriously curtail consistently reproducible production of uniform dendritic ribbon.

Accordingly, it is an object of the present invention to provide an apparatus particularly adapted for more precise controlled growing or pulling of a dendritic crystal from a melt.

Other objects of the present invention will be obvious and will appear hereinafter.

For a better understanding of the nature and objects of the present invention, reference should be had to the following description of the detailed drawings, in which.

The present invention comprises an improved dendrite crystal pulling machine comprising a reel for pulling and storing dendrites wherein the reel is demountably affixed to a reel carrier gear, means joining the reel carrier gear for limited axial and radial movement to a base support in relation to a melt of crystal material, and damping or braking means cooperating with the reel carrier gear to minimize slack effects in the train between the driving means and reel carrier gear.

Figure 1:
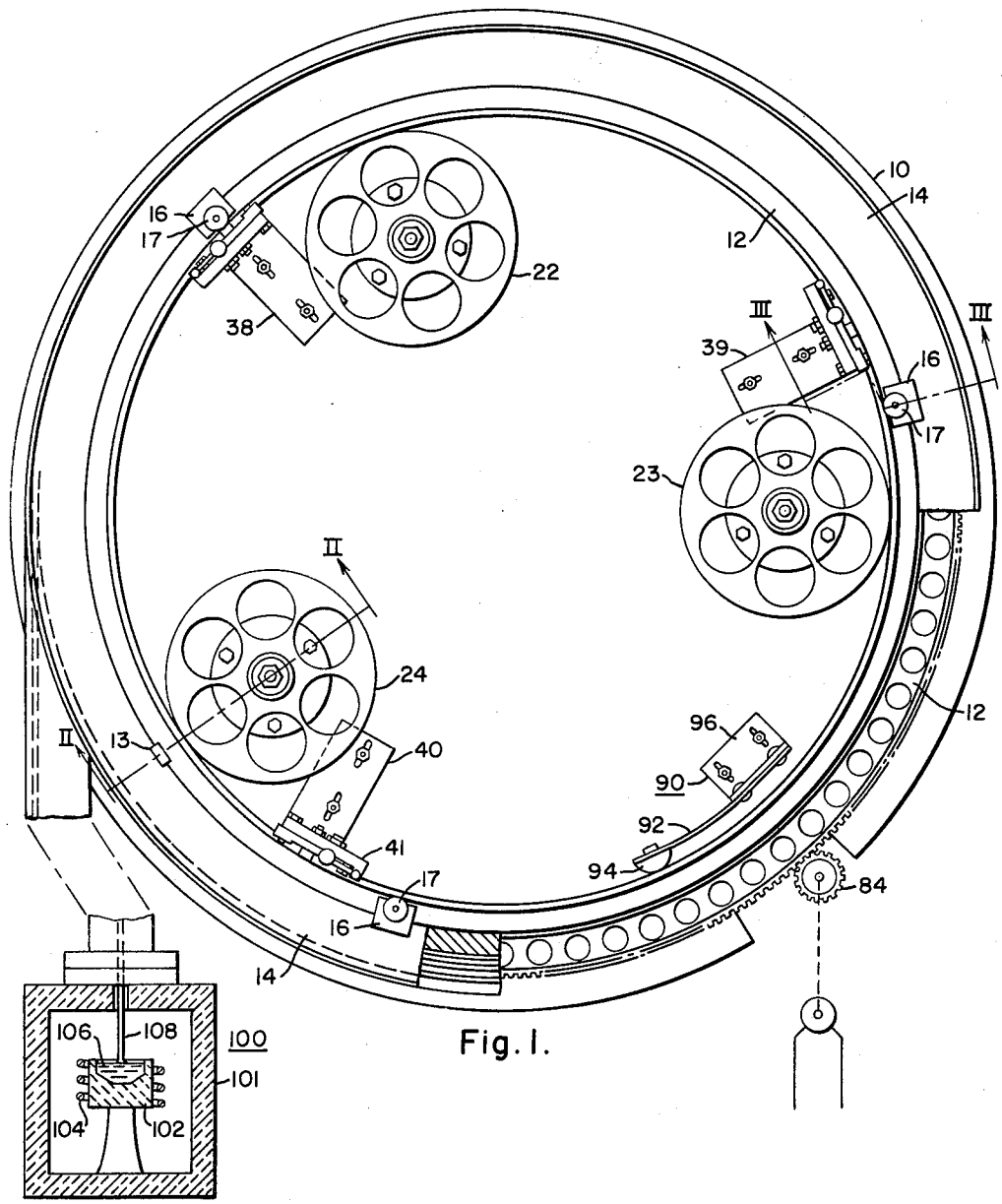
FIGURE 1 is an elevation partly in cross section of an illustrative embodiment of the present invention.

Referring now to FIG. 1 generally, the reel apparatus of the invention comprises a supporting base 10, a reel carrier gear 12 connected to the base by at least three wheels 22, 23 and 24 and locating and supporting means comprising at least three platforms 38, 39 and 40, a gear drive 84 connected to the reel carrier gear 12, a damping device 90 riding against the reel carrier gear and a reel 14 demountably joined to the reel carrier gear. It should be noted that in FIG. 1 the furnace apparatus is shown out of its true tangential position relative to the reeling apparatus for purposes of illustration.

The base 10 is a suitably shaped member to support the several components and be connected to a furnace 100 or other dendrite growing apparatus. The base may include provisions for hermetically sealing the reeling apparatus and furnace such as, for example, flanges and gaskets or grooves and O-rings, if desired.

Figure 3:
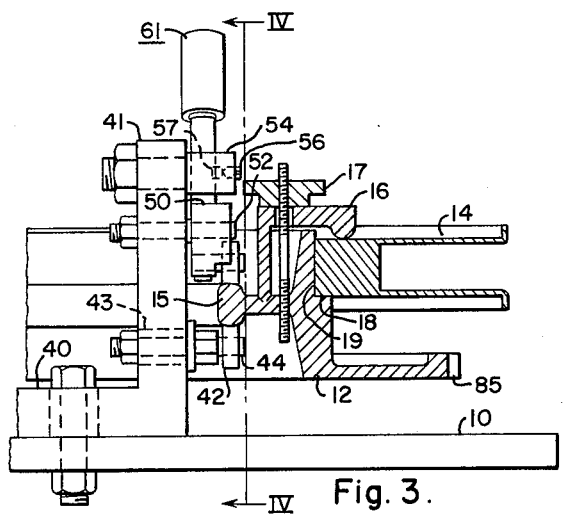
FIG. 3 is a somewhat enlarged fragmentary view, partly in cross section, taken along the line III—III in FIG. 1.

The reel carrier gear 12, as shown in FIGS. 1 and 3, is an annular member comprising ledges or abutments 18 and 19 on which the reel 14 can rest. A readily releasable clamp 16 and nut arrangement 17 holds the reel 14 demountably in place thereon. On a peripheral portion of the reel carrier gear 12 are provided gear teeth 85 to be engaged by a driving gear 84 driven from a source of power. A suitably shaped support rim 15 is provided for engagement with the reel carrier gear locating and supporting means.

The reel 14 can be of the configuration shown in FIG. 3 or any other desirable configuration fitting the reel carrier.

An interlock means 13, such as for example a key, between the abutment 19 of the reel and the reel carrier gear may be included as a positive means for preventing the rotation of one relative to the other. It has been found, however, that under normal operating loads the simple clamp 16 and nut means 17 are adequate to hold the reel in place.

Figure 4:
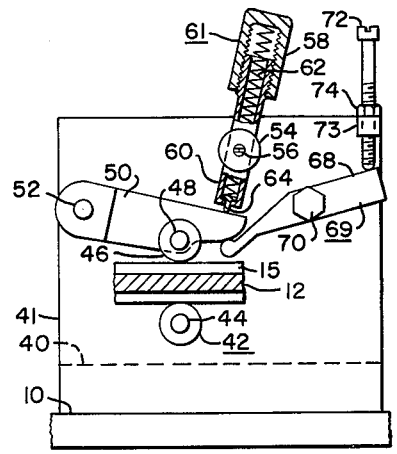
FIG. 4 is a fragmentary view partly in cross section taken along the line IV—IV in FIG. 3.

Three or more platforms 38, 39 and 40 are provided to restrain axial movement or side play of the reel carrier gear 12. Each platform, such as 40 as shown in FIGS. 3 and 4, includes a platform flange 41 which carries near its foot an inner roller 42 affixed to shaft 44 adjustably mounted by means of nuts, in a slot 43 in the platform flange 41 to permit adjustment in the direction perpendicular to the base 10, thus establishing the rotation plane of the reel carrier relative to the base 10. The inner wheel or roller 42 should rotate with relatively low friction and can be comprised of, for example, a simple ball bearing assembly of which the outer race bears against the rim 15 of the reel carrier gear. The surface of rim 15 is preferably of curved cross sections where it comes into contact with roller 42 since this configuration minimizes friction and alignment problems.

The remaining element of axial restraint, specifically, means for holding the reel carrier gear 12 in a position relative to the inner roller 42, is accomplished by an outer roller 46 affixed by a relatively low friction means to a shaft 48 which in turn is affixed to a rocker arm 50 pivotally mounted to the platform flange 41 by a shaft 52. The outer roller 46 can be of similar construction to the inner roller 42. This arrangement permits spacing the wheels 42 and 46 to suit various reel carrier gear rim 15 thicknesses.

The force or pressure with which the rocker 50 and outer roller 46 can urge the reel carrier gear 12 against the inner wheel or roller 42 is furnished by an arrangement comprising a rocker spring assembly 61 shown in FIG. 4. This rocker spring assembly 61 comprises a cylindrical spring housing 60 containing a spring 62 having one end pressing against a plunger 64 disposed in and having a portion protruding from an aperture at one end of the housing and a spring adjustment cap 58 pressing against the other end of the spring and threadedly engaging the other end of the housing. The plunger 64 is a disk larger than the aperture at the end of the housing and has a center pin portion which protrudes through the aperture. By tightening or loosening the spring adjustment cap 58 the force of the spring acting on the plunger is increased or decreased. This enables the roller 46 to move with a desired degree of resiliency when surface irregularities of rim 15 pass thereunder.

The spring housing 60 is joined to the platform flange 41 by the spring housing bracket 54 which can be of any configuration consistent with its function which is to keep the rocker spring adjustment assembly 61 firmly in place on the platform flange 41. The configuration illustrated in FIGS. 3 and 4 is a simple cylinder or rod, one end of which is suitably shaped for fastening to the platform flange 41, the other end being shaped for accommodating the spring housing 60 and set screw 56 which holds the spring housing 60 in place in the spring housing bracket 54. A set screw shoe 57 suitably shaped to minimize distortion of the spring housing may be utilized, if desired.

It is to be noted that this spring loaded rocker arrangement allows for minor deviations in the thickness of the reel carrier gear rim 15 without any resultant binding or jerking effect on the reel carrier and reel.

It is to be understood that other suitable means for urging the rocker toward the reel carrier gear may be used such as a simple flat spring which may or may not be adjustable and the arrangement shown is principally for illustrating one means which the inventors have used successfully.

An additional adjustment is afforded by a rocker limit means 69 comprising a rocker limit lever 68 pivotally mounted to the platform flange 41 by a shaft 70, and a threaded adjustment screw 72 joined to the platform flange by a threaded screw guide 73 on the platform flange. A lock nut 74, or other suitable means, may be used to lock the adjustment screw in place. Thus, by manipulating the adjustment screw, the travel of the rocker toward the rim 15 of reel carrier gear 12 is limited precisely as desired. For example, there may be provided .002 inch reel carrier side play free of resistance by the rocker spring assembly. Thus, rotation drag of the reel carrier gear 12 caused by the platforms 40 can be kept to a minimum.

Figure 2:
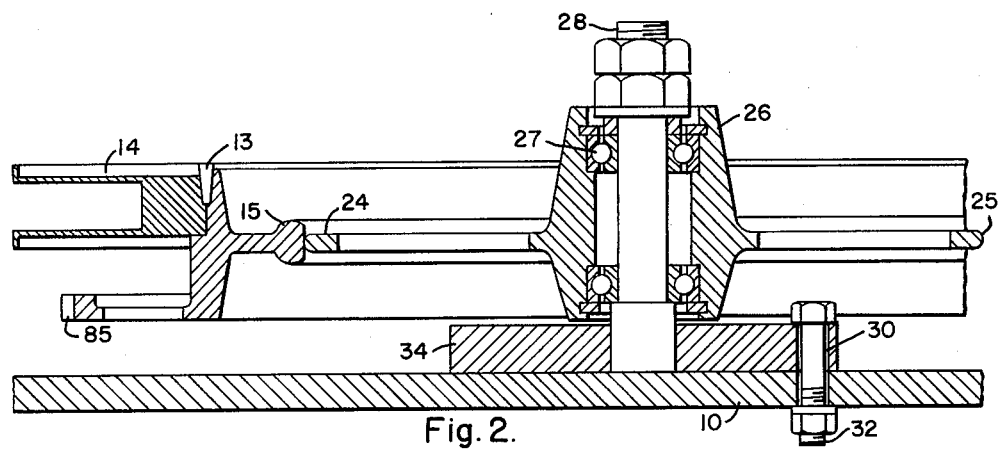
FIG. 2 is a somewhat enlarged fragmentary cross-sectional view taken along the line II—II in FIG. 1.

Three or more wheels 22, 23 and 24, as shown in FIG. 1, restrain and support the reel carrier gear 12 in the radial direction. Each wheel arrangement, as will be seen with specific reference to wheel 24 in FIG. 2, comprises a hub 26 rotatably mounted by a ball bearing 27 or other relatively low friction means to a shaft 28 which is adjustably mounted to the base 10 by a shaft flange 34 and a nut and bolt arrangement 32 or other suitable means permitting adjustment of the shaft 28 position on the base. Such adjustment may be accomplished by the use of oversize holes or slots 30 in either the base 10 or shaft flange 34 or both as illustrated in FIG. 2. Each wheel may include a curved peripheral edge 25 to permit tilting of the reel carrier gear 12 for any necessary adjustment without damaging the contact surfaces of either the reel carrier gear rim 15 or wheels 22, 23 and 24. The wheels 22 and 23 actually hold the weight of the reel carrier gear assembly. The third wheel 24 can be adjusted radially in relation to the reel carrier gear rim; for example, in one embodiment, it has been set back from .002 inch to .010 inch whereby in the event of an excessively fast rotation start in the seeding direction the wedging action of the gear teeth of the drive components is thereby limited. By adjusting the wheel 23 horizontally, as seen in FIG. 1, the play between drive components, for example, driving and driven gears, can be varied.

As illustrated in FIG. 1, the wheels are not positioned symmetrically. Wheel 22 is positioned approximately 20° to the left of the vertical center line of the reel carrier gear and supports most of its weight. Wheel 23 is positioned substantially on the horizontal center line of the reel carrier gear so as to provide maximum precision in its lateral positioning. The location of wheel 24 along the reel carrier gear can be varied somewhat from that shown without substantial effect on the support system. This arrangement is one which has been used successfully but which can, however, be varied.

The reel carrier gear 12 is driven by a gear drive 84 which is capable of driving it positively in either direction. Direction reversal may be achieved by a gear shift means but an electrically controllable variable speed electric motor with suitable means for direction reversal is preferable from the standpoint of smoothness of motion.

The damping device 90 acts upon a suitable surface of the reel carrier gear 12 thereby imparting any desired restraint into its motion. The damping device 90 comprises a shoe 94 of wood, ceramic, plastic, metal or other suitable material which contacts the rim 15 of the reel carrier by the force imparted by a flat spring 92 affixed to the shoe 94 at one end and to a mounting bracket 96 at the other end. The mounting bracket 96 in turn is adjustably joined to the base 10 such that its adjustment varies the tension in the spring which urges the shoe against the reel carrier gear 12. Any drive train slack effects can be minimized by this damping means.

Obviously, the braking or damping device 90 utilizes frictional force. In describing the platforms 38, 39 and 40 and wheels 22, 23 and 24 for supporting and restraining the reel carrier gear 12, mention was made of minimizing friction, the reason being to minimize uncontrolled friction in the various components, and to provide instead a controlled and uniform friction drag means such as the damping means 90 described herein.

Other means of urging the shoe 94 against the reel carrier could be utilized, for example, a coil spring in lieu of a flat spring or even a different spring mounting means. Further, other means of imparting the frictional restraint may be utilized such as, for example, a rubber wheel contacting the reel carrier gear rim and being restricted in its rotation by a friction brake or the like. The present invention extends to such other arrangements, the scheme shown being principally for illustrative purposes.

The growth of dendritic material with the present invention can be performed in the same fashion indicated in U.S. Patent No. 3,031,403 and U.S. patent application, Serial No. 37,931, filed June 22, 1960, and Serial No. 219,029, filed August 23, 1962, and reference should be made thereto for more complete details.

Briefly, referring to FIG. 1, the dendrite growing apparatus 100 comprises a sealed enclosure 101 within which is a crucible 102 surrounded by an induction coil 104 for heating it to an elevated temperature sufficient to melt a charge 106 of a material such as silicon or germanium. A seed crystal which may comprise a previously grown dendrite 108 is lowered into the melt 106 by slowly revolving the reel 14 and carrier gear 12 in a counterclockwise direction, supercooling the melt, and then reversing the direction of the reel and carrier gear imparting a slow, uniform clockwise rotation at a speed to cause the dendrite 108 to be pulled upwardly at the desired pull rate. A portion of the melt will form a dendrite at the end of the seed dendrite 108, and it will be pulled onto and wound or stored on the reel 14.

From the foregoing discussion and description, it is evident that this invention provides a unique and extremely useful apparatus combination for satisfying the strenuous reel and furnace alignment, and uniform and controlled pull rate requirements in the preparation of dendritic material in accordance with the technique shown in U.S. Patent No. 3,031,403.

While the invention has been described particularly with respect to pulling dendrites from a melt, it will be understood that it can be employed for pulling and reeling other materials. It should also be noted that the illustration and description of the details of the invention relate principally to one embodiment use successfully, and that the invention can be practiced otherwise than as specifically illustrated and described herein.

We claim as our invention:

1. Apparatus suitable for pulling and storing dendritic crystalline material comprising a supporting base, an annular reel carrier gear mounted on the base for rotary movement thereon, a reel attached to the annular reel carrier gear by demountable connecting means, a driving mechanism for rotating said reel carrier gear comprising a gear drive train driven by power drive means, at least three wheels adjustably mounted on said base and bearing against a diametrical surface of said reel carrier gear thereby supporting it for limited radial movement, and at least three platforms adjustably attached to the base, said platforms comprising at least two rollers between which the reel carrier gear is positioned, the roller nearest the base being adjustably attached to its platform, whereby by such adjustment in a direction perpendicular to said base the plane of said reel carrier gear is established, and the other roller being attached to one end of a rocker arm, the other end of the rocker arm being pivotally attached to the platform whereby the said one end with the roller is rotatable in a plane perpendicular to the base, and spring means bearing on the rocker arm to cause the said other roller to bear against the reel carrier gear, and adjustable limiting means bearing on the end of the rocker arm so that the side play of said reel carrier gear can be controlled.

2. Apparatus suitable for pulling and storing dendritic crystalline material comprising a supporting base, an annular reel carrier gear mounted on the base for rotary movement thereon, a reel attached to the annular reel carrier gear by demountable connecting means, a driving mechanism for rotating said reel carrier gear comprising a gear drive train driven by power drive means, at least three wheels adjustably mounted on said base and bearing against a diametrical surface of said reel carrier gear thereby supporting it for limited radial movement, at least three platforms adjustably attached to the base, said platforms comprising at least two rollers between which the reel carrier gear is positioned, the rollers nearest the base being adjustably attached to said platform, whereby by such adjustment in a direction perpendicular to said base the plane of said reel carrier gear is established, and the other roller being attached to one end of a rocker arm, the other end of the rocker arm being pivotally attached to the platform whereby the said one end with the roller is rotatable in a plane perpendicular to the base, spring means bearing on the rocker arm to cause the said other roller to bear against the reel carrier gear, and adjustable limiting means bearing on the end of the rocker arm so that the side play of said reel carrier gear can be controlled, and a damping device comprising a spring loaded block which contacts a surface of the rotating reel carrier gear, said spring loaded block being adjustable such that desired restraint may be imparted to the motion of the reel carrier gear.

References Cited by the Examiner

UNITED STATES PATENTS

| | | | |
|---|---|---|---|
| 543,470 | 7/95 | Feder | 242—99 |
| 1,827,186 | 10/31 | Borgeson | 242—4 |
| 1,882,771 | 10/32 | Burdick | 242—84.52 |
| 1,957,068 | 5/34 | Kelman | 242—6 |
| 2,437,309 | 3/48 | Veatch | 242—4 |
| 2,928,624 | 3/60 | Scheuerpflug | 242—117 |

MERVIN STEIN, *Primary Examiner.*